United States Patent
Gray et al.

(10) Patent No.: US 8,055,698 B2
(45) Date of Patent: Nov. 8, 2011

(54) NETWORK RECYCLE BIN

(75) Inventors: James Christopher Gray, Bellevue, WA (US); Todd R. Headrick, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 454 days.

(21) Appl. No.: 11/700,223

(22) Filed: Jan. 30, 2007

(65) Prior Publication Data

US 2008/0183802 A1 Jul. 31, 2008

(51) Int. Cl.
*G06F 15/16* (2006.01)
*G06F 15/167* (2006.01)
*G06F 12/00* (2006.01)
*G06F 3/00* (2006.01)

(52) U.S. Cl. ........ 709/201; 709/203; 709/213; 709/217; 709/219; 707/821; 707/827; 715/733; 715/741; 715/748

(58) Field of Classification Search .................... 709/201
See application file for complete search history.

(56) References Cited

U.S. PATENT DOCUMENTS

| | | | |
|---|---|---|---|
| 5,379,423 A * | 1/1995 | Mutoh et al. ................ | 707/204 |
| 5,388,196 A * | 2/1995 | Pajak et al. ................. | 715/751 |
| 6,366,988 B1 | 4/2002 | Skiba et al. | |
| 6,446,091 B1 * | 9/2002 | Noren et al. ................ | 707/202 |
| 6,611,836 B2 | 8/2003 | Davis et al. | |
| 6,615,224 B1 | 9/2003 | Davis | |
| 2002/0083064 A1 * | 6/2002 | Davis et al. ................ | 707/100 |
| 2002/0161890 A1 | 10/2002 | Chen | |
| 2004/0215644 A1 | 10/2004 | Edwards, Jr. et al. | |
| 2006/0149836 A1 * | 7/2006 | Robertson et al. ........... | 709/224 |
| 2006/0173935 A1 | 8/2006 | Merchant et al. | |
| 2006/0218197 A1 * | 9/2006 | Makela et al. ............... | 707/200 |
| 2006/0259461 A1 | 11/2006 | Kapur | |
| 2008/0162483 A1 * | 7/2008 | Becker et al. ................ | 707/9 |

FOREIGN PATENT DOCUMENTS

EP 1669875 A1 6/2006

OTHER PUBLICATIONS

"Examples using VFS Recycle Bin module", http://www.amherst.edu/~bbstone/howto/samba.html.
"Introduction to Shadow Copies of Shared Folders", Date: Mar. 2003, http://download.microsoft.com/download/f/3/d/f3da10e8-c9fd-454d-9a54-c765d738449d/SCR.doc.
Held, Gilbert, "Focus on Undelete 3.0", Date: 2003, http://delivery.acm.org/10.1145/960000/958823/p433-held.pdf key1=958823&key2=8535884611&coll=GUIDE&dl=GUIDE&CFID=5784351&CFTOKEN=96717772.

* cited by examiner

*Primary Examiner* — Jeffrey Pwu
*Assistant Examiner* — Jasmine Myers
(74) *Attorney, Agent, or Firm* — Russell S. Krajec; Krajec Patent Offices, LLC

(57) ABSTRACT

A network recycle bin is used to store deleted files in a managed directory that is available across a network connection. Files stored in a shared directory or other network-accessible file storage system are moved to the managed directory upon deletion. Because the managed folder is part of the network-accessible file system, any permissions, authorizations, or settings for files may be unaltered after movement into the managed folder. In some embodiments, a local recycle bin may be merged with a network recycle bin from a user experience.

17 Claims, 3 Drawing Sheets

NETWORK RECYCLE BIN

BACKGROUND

Computer data storage systems often allow users to create data files and then copy, change, move, and delete those files. Some graphical user interfaces have a 'recycle bin', 'trash bin', or other device that enables a user to delete a file but later recover the file if deleted in error. The user merely drags and drops a file over in the recycle bin to delete the file. If the user wants to recover the file, the user may click on the recycle bin to open the recycle bin and select a file to recover.

SUMMARY

A network recycle bin is used to store deleted files in a managed directory that is available across a network connection. Files stored in a shared directory or other network-accessible file storage system are moved to the managed directory upon deletion. Because the managed folder is part of the network-accessible file system, any permissions, authorizations, or settings for files may be unaltered after movement into the managed folder. In some embodiments, a local recycle bin may be merged with a network recycle bin from a user experience.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
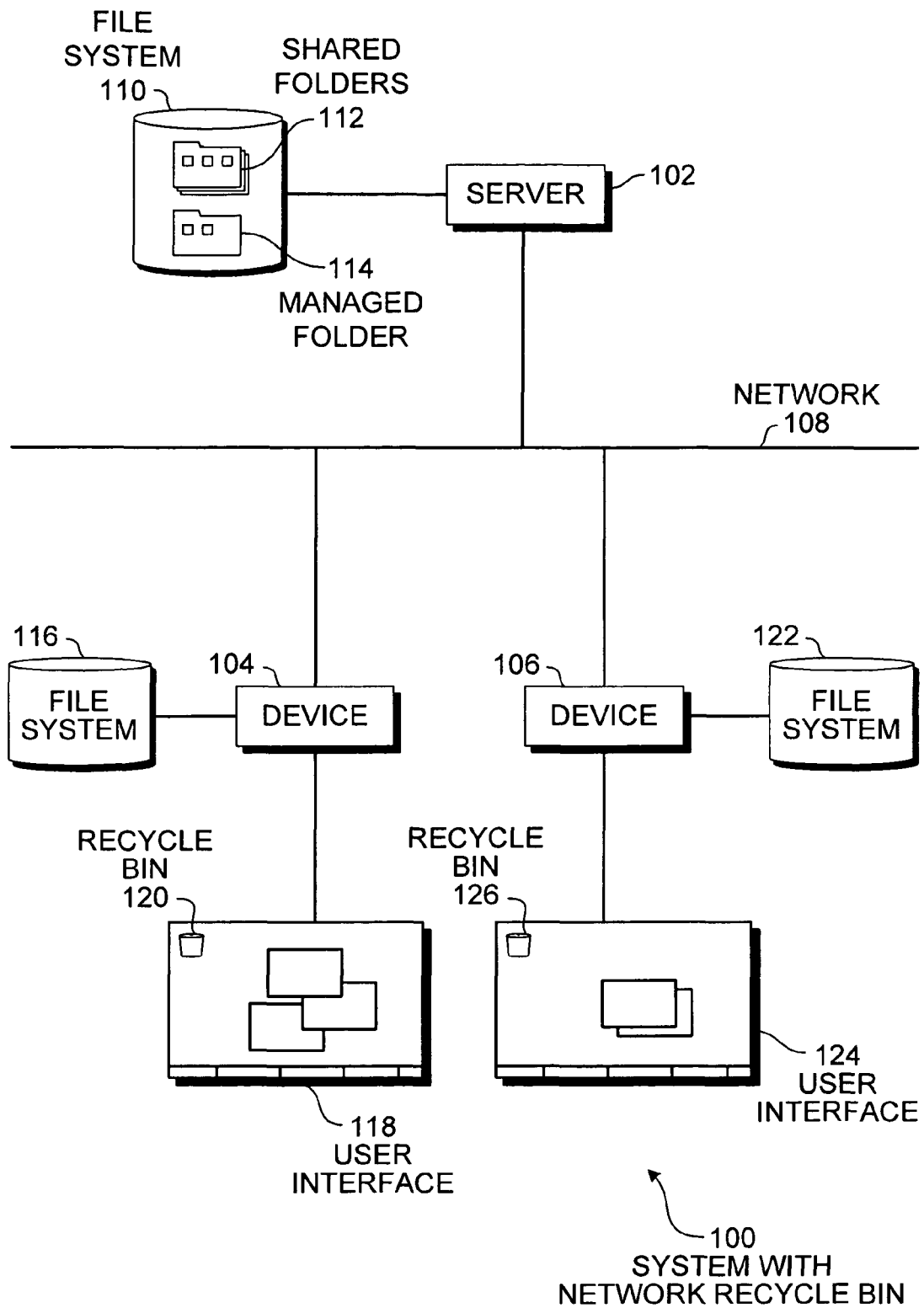
FIG. 1 is a pictorial illustration of an embodiment showing a system with a network recycle bin.

A network recycle bin is a managed folder on a server computer that stores and manages items that have been tagged for deletion. The managed folder may have various eviction policies that may cull the files stored in the folder. The network recycle bin may be made available across a network so that users may recover files that were slated for deletion from the network file system.

The network recycle bin may be a folder or directory located within a server file system. As such, the network recycle bin may keep any permissions or access restrictions in place for any files placed therein. For example, a network recycle bin may contain files deleted by different users, but when the network recycle bin is viewed by any specific user, only those files will be displayed for which the specific user has access.

A recycle bin on a local device may display deleted files that include files from the network recycle bin. In some instances, the recycle bin may not distinguish between files located on a network file system and those located on a local file system.

Specific embodiments of the subject matter are used to illustrate specific inventive aspects. The embodiments are by way of example only, and are susceptible to various modifications and alternative forms. The appended claims are intended to cover all modifications, equivalents, and alternatives falling within the spirit and scope of the invention as defined by the claims.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, microcode, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a system with a network recycle bin. A server 102 is connected to devices 104 and 106 via the network 108. The server 102 has a file system 110 that contains shared folders 112 and a managed folder 114. The managed folder 114 is a folder to which various eviction strategies may be applied.

Eviction strategies or policies may include rules such as removing files over a predetermined age, removing older files to achieve a certain storage space requirement, keeping files of certain types longer than others, removing files of a certain owner or permission setting sooner than those of another owner or permission setting, or any other rule, policy, or strategy that one can imagine.

The managed folder 114 is a network recycle bin into which deleted items are moved until the eviction policies cause the item to be permanently removed from the file system. A user may be able to open the managed folder and recover files slated for deletion by moving the files out of the managed folder and into a different folder.

The device 104 has a file system 116 and a user interface 118 that contains a recycle bin 120. Similarly, the device 106 has a file system 122 and a user interface 124 that has a recycle bin 126. The recycle bins 120 and 126 may be an icon or link to a file browser or other interface by which a user may manipulate or recover deleted items.

The recycle bins 120 and 126 may link to managed folders that contain network files marked for deletion and some embodiments may also include local files from file systems 116 and 122, respectively, that are marked for deletion. Other embodiments may have a separate managed folder for files marked for deletion from a local file system in addition to a managed folder for files from a file system accessed through a network.

The user interfaces 118 and 124 may be graphical user interfaces or command line or text based user interfaces. Each type of user interface may have one or more mechanisms for accessing the managed folder 114. For example, a graphical user interface may have different file browsers, command line interfaces, or other mechanisms by which a user may access the managed folder 114. In some embodiments, the managed folder 114 may be a specially-named folder within the file system 110 having shared folders 112. In such an embodiment, any mechanism by which the shared folders 112 may be accessed may be able to access the managed folder 114.

The server 102 may be any type of network device that has a file system 110 that is accessible by other devices through a network. In some embodiments, the server 102 may be a computing device running a server-type operating system. In other embodiments, the server 102 may be a client-type operating system that enables the file system 110 to be shared across a network 108.

The network 108 may be any type of communications network whereby two devices may communicate. In many embodiments, the network 108 may be a TCP/IP network such as may be used in a local area network (LAN), but other embodiments may use DOCSIS or some other communication protocol and may use hard wired, fiber optic, wireless, or any other medium to connect the various devices.

The devices 104 and 106 may be a personal computer, network appliance, wireless device, personal digital assistant, or any other device capable of connecting to a network and having a user interface. In some embodiments, the devices 104 and 106 may not have a local file system 116 and 122, respectively.

Figure 2:
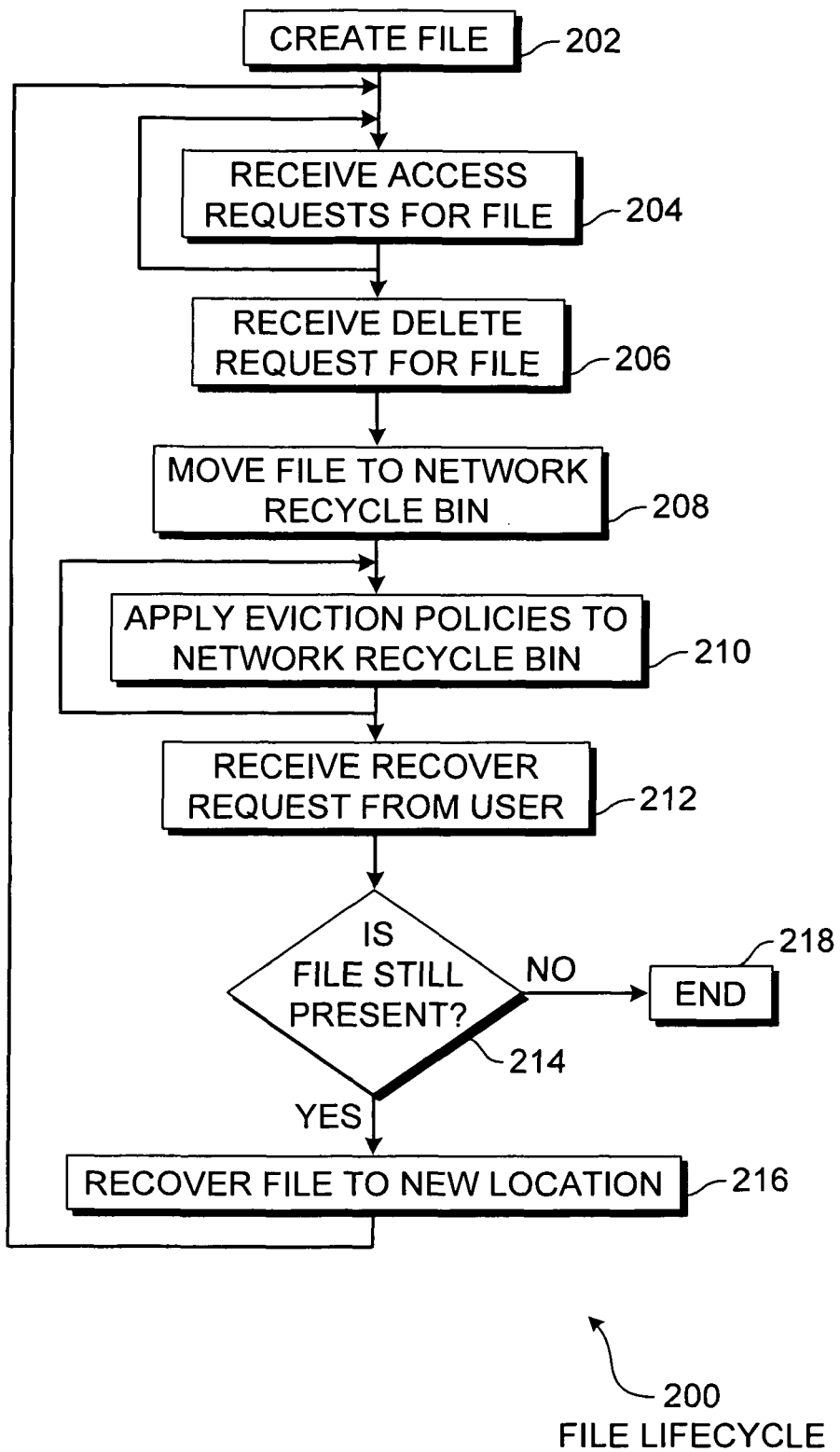
FIG. 2 is a flowchart illustration of an embodiment showing a file lifecycle.

FIG. 2 is a flowchart illustration of an embodiment 200 of a file lifecycle. A file is created in block 202 and access requests are processed for the file in block 204. When a delete request is received in block 206, the file is moved to a network recycle bin 208. Eviction policies are applied to the network recycle bin periodically in block 210. When a recover request is received from a user in block 212 and the file is no longer present in block 214, the process ends in block 218. If the file is still present in block 214, the file is recovered to a new location in block 216 and the process returns to block 204.

Embodiment 200 is merely one method by which files may be handled using a network recycle bin. Other methods may incorporate different sequences or steps to move a file into a status where eviction policies may be applied to the file. During the period of time when the eviction policies are applied and before the eviction policies result in the permanent removal of the file from the file system, a user may recover the file through the network recycle bin.

A user may recover a file from the network recycle bin by moving the file into a different directory. In some graphical user interfaces, a user may open a graphical representation of the network recycle bin and drag and drop a file into another location in order to recover the file from deletion.

Embodiment 200 effectively adds a step to a 'delete' command. Rather than executing the 'delete' command and permanently removing a file from a file system, the file is moved to the network recycle bin. The network recycle bin may have eviction policies that may cause the file to be permanently removed from a file system at a later point. In effect, a deletion action is delayed by the eviction policies of the network recycle bin.

Because a network recycle bin may handle files that are accessible to several users, one user may put a file in the network recycle bin and another user may recover the file. File access settings and user permission settings may be unchanged when a file is moved from a shared network directory to a network recycle bin.

A file access setting may be any property assigned to a file that may define the scope of a user's interaction with the file. File access settings are generally a property of the file itself and may apply across groups of users. A common example of a file access setting is a property of 'read-only' that may prohibit the file from being overwritten. In some embodiments, file access settings may be set and changed for entire groups of files in a single command.

User permission settings may refer to any setting or property that defines a user's ability to interact with a file system. For example, a user may be given different permissions to read, modify, delete, and create files within a file system. The user's permissions may be assigned differently for different folders within a file system and for different types of files or individual files within a file system. User permission settings are properties of individual users, but may be applied and changed to users as a group.

Figure 3:
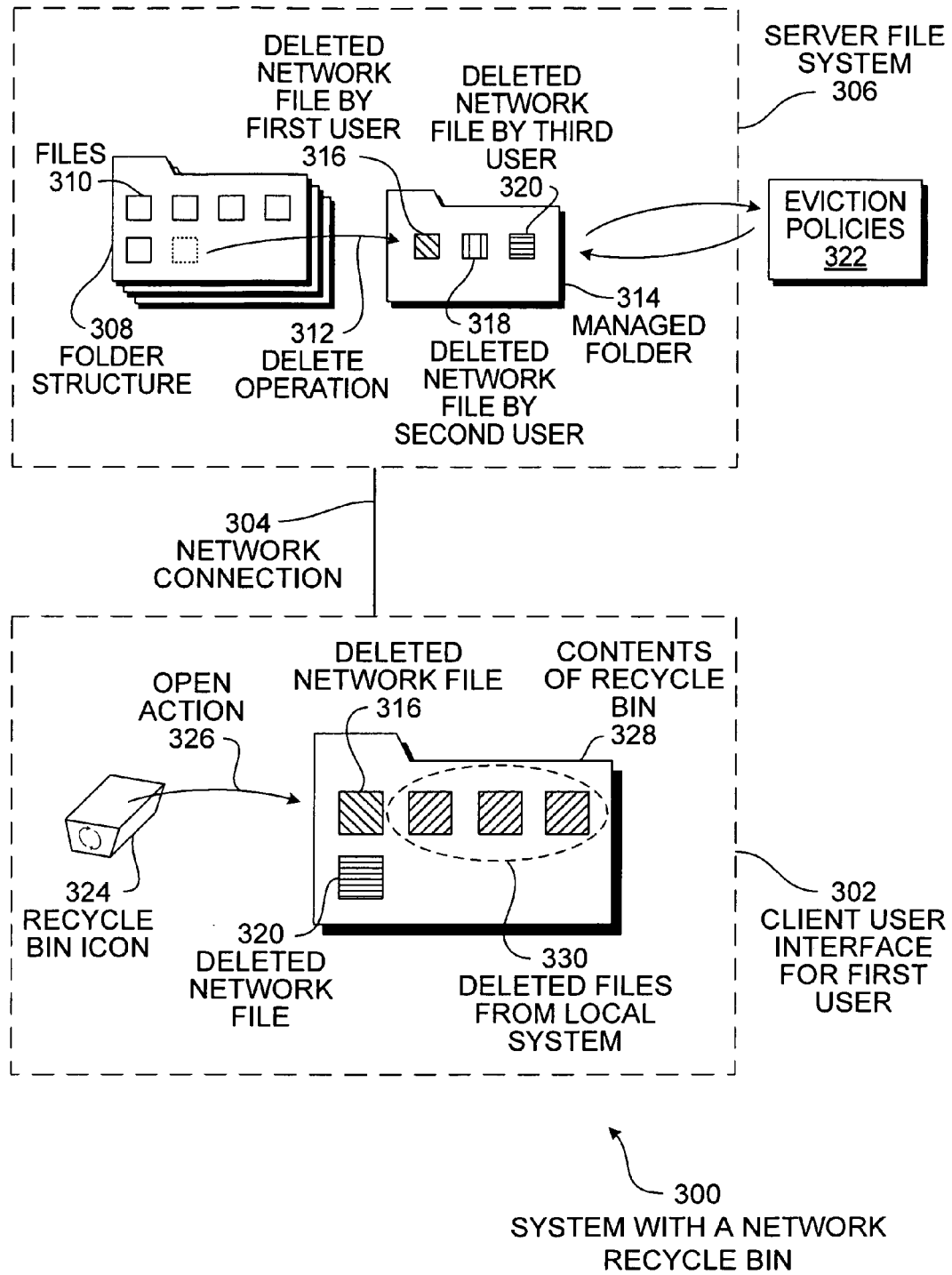
FIG. 3 is a diagram illustration of an embodiment showing a system with a network recycle bin and a client user interface.

FIG. 3 is a diagram illustration of an embodiment 300 showing a system with a network recycle bin. A client user interface 302 for a first user is shown connected via a network 304 to a server file system 306. The server file system 306 contains a folder structure 308 that contains files 310. Through a delete operation 312, a file is moved from the folder structure 308 into a managed folder 314 and shown as file 316. Similarly, files 318 and 320 are files deleted by a second and third user, respectively.

The client user interface 302 comprises a recycle bin icon 324. Through an open action 326, the contents of the recycle bin 328 are displayed. Within the contents of the recycle bin 328 are shown the network files 316 and 320 from the managed folder 314 as well as deleted local files 330.

The managed folder 314 may be a network recycle bin that contains deleted files 316, 318, and 320, each from a different user. On a first user's graphical user interface 302, the file 316 that was deleted by the user is displayed but the file 318 is not displayed because the file 318 may have restricted access settings or the first user does not have the proper permission settings to view the file 318.

The network file 316 has been deleted by the user associated with the user interface 302, while the file 320 has been deleted by a third user. The user may not have access settings or permissions to view file 318, but does have permissions to view file 320. The files 316, 318, and 320 may have various access settings that are set when the file is created or applied in a network file system. Those file access settings may be maintained when the files are moved into the managed folder 314. In many situations, one user may 'delete' a file, such as file 320 by moving the file to the managed folder 314, but another user may be able to recover the file.

The managed folder 314 contains files deleted by many different users and may have eviction policies 322 applied to the managed folder 314. The eviction policies 322 may be applied across all of the files 316, 318, and 320 in several different manners.

Certain portions of the eviction policies 322 may be applied across all files within the managed folder 314. For example, files of a certain type may be kept for a very short period of time or deleted immediately, regardless of the user. Such an example may be applied to temporary files that are used by a software application and not used again. In another example, files may be removed from the managed folder 314 in accordance with the eviction policies 322 to keep a predetermined amount of free space available on a data storage system.

Other portions of the eviction policies 322 may be applied to specific users. For example, a first user may have an eviction policy set so that files over 7 days old are deleted. Another user may have an eviction policy set so that files over 30 days old are deleted. One user may have files of a first type kept for 30 days and files of a second type kept for 90 days, while a second user may have files of the first type kept for 24 hours and the second type kept for 120 days.

Various eviction policies may be created, managed, and applied in various ways depending on the specific embodiments. In some cases, user specific eviction policies may be applied first and then global eviction policies applied after, while in other cases the reverse may be true. Still other cases may define and apply eviction policies in different manners.

The contents of the recycle bin 328 for a specific user's graphical user interface 302 may include deleted files 316 and 320 from the managed folder 314 as well as deleted files 330 from a local data storage system. In some embodiments, each file system may have a separate recycle bin or managed folder for deleted files. In other embodiments, such as embodiment 300, deleted files from different file systems may be combined into a single recycle bin 328. In such an embodiment, a user may or may not be able to distinguish between files that came from a local file system and those from a network file system.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method performed on a network client device, said method comprising:

displaying a network file icon in a graphical user interface as part of a network file system, said network file icon representing a network file stored on a network server;

receiving a delete request for said network file, said delete request coming through said graphical user interface and being made by a first user;

sending a command to said network server to move said network file into a server managed folder storing a plurality of network deleted files, said server managed folder having eviction policies, said plurality of network deleted files comprising network files deleted by said first user and network files deleted by a second user of a second network client device accessing said network file system, and said eviction policies are rules selected from a group consisting of: removing a file based on a predefined length of time to store said file, removing older files to maintain a storage space requirement, removing a file based on a type of said file, removing a file based on an owner or permission setting of said file, and combinations thereof;

displaying a local file icon using a graphical user interface as part of a local file system, said local file icon representing a local file stored on a local file system;

receiving a delete request for said local file, said delete request coming through said graphical user interface;

moving said local file to a local recycle folder, said local recycle folder being located on said network client device and storing a plurality of local deleted files; and presenting, on said graphical user interface, a recycle folder comprising network file icons for said plurality of network deleted files and local file icons for said plurality of local deleted files;

where said local file is not transferred to said server managed folder and said network file is not transferred to said local recycle folder.

2. The method of claim 1 further comprising:

presenting a second network file icon in said recycle folder, said second network file icon representing a second network file deleted by the second user.

3. The method of claim 2 further comprising:

identifying a third network file in said server managed folder, said third network file being accessible by said second user but not said first user; and not displaying a third network file icon in said recycle folder, said third network file icon representing said third network file.

4. The method of claim 3 further comprising:

changing access permissions on said third network file in said server managed folder such that said third network file is accessible by said first user; and presenting a third network file icon in said recycle folder, said third network file icon representing said third network file.

5. The method of claim 4 further comprising:
receiving a restore request from said graphical user interface for said first network file; and
moving said first network file from said server managed folder to said network file system.

6. The method of claim 1, said eviction policies comprising:
removing any files that have been in said server managed folder for more than a predetermined time.

7. A computer readable storage medium comprising computer readable instructions adapted to perform the method of claim 1.

8. A system comprising:
a server comprising:
a first network connection;
a network file system adapted to be accessed by a user over said first network connection from a client device;
a processor configured to:
receive an access request for a first network file, said access request being received over a network;
receive a delete request for said first network file;
move said first network file into a server managed folder storing a plurality of network deleted files, said network deleted files comprising network files deleted by said first user and network files deleted by a second user of a second network client device accessing said network file system;
apply eviction policies to said server managed folder, said eviction policies comprising a plurality of rules for removing files from said server managed folder, said rules selected from a group consisting of: removing a file based on a predefined length of time to store said file, removing older files to maintain a storage space requirement, removing a file based on a type of said file, removing a file based on an owner or permission setting of said file, and combinations thereof; and
make said first network file available over said network to said client device;
said client device comprising:
a network connection;
a local file system stored on a local storage system;
access to a network file system, said network file system being accessed through said network connection;
a deletion mechanism deleting a local file in said local file system by removing said local file from said local file system and transferring said local file to a local recycle folder storing a plurality of local deleted files;
said deletion mechanism further deleting a first network file in said network file system by sending said delete request to said server, causing said server to move said first network file to said server managed folder, said server managed folder having said eviction policies applied; and
a user interface comprising a recycle folder comprising visual indicators of contents from both said local recycle folder and said server managed folder in said recycle folder;
where said local file is not transferred to said server managed folder and said first network file is not transferred to said local recycle folder.

9. The system of claim 8, said access requests being performed by said user having a permission setting.

10. The system of claim 9, said processor further configured to:
apply said permission setting for said user to said first network file in said server managed folder.

11. The system of claim 8, said first network file having an access setting.

12. The system of claim 11, said client device further configured to:
apply said access setting to said network file in said server managed folder.

13. The system of claim 8, said eviction policies comprising:
removing any files that have been in said server managed folder for more than a predetermined time.

14. The system of claim 8, said deletion mechanism being caused by a drag and drop operation in said user interface.

15. The system of claim 8, said client device further comprising:
a restore mechanism that receives a restore command for restoring said first network file and transmits a restore command to said server, said server processor further configured to move said first network file from said server managed folder to said network file system.

16. A client device comprising:
a network connection;
a local storage system;
a local file system stored on said local storage system;
access to a network file system, said network file system being accessed through said network connection;
a deletion mechanism deleting a local file in said local file system by removing said local file from said local file system and transferring said local file to a local recycle folder storing a plurality of local deleted files;
said deletion mechanism further deleting a network file in said network file system by removing said network file from said network file system and transferring said network file to a network recycle folder, said network recycle folder being a managed folder comprising a plurality of network deleted files from said network file system and having eviction policies, said plurality of network deleted files comprising network files deleted by a first user of said client device and network files deleted by a second user of a second client device accessing said network file system, and said eviction policies are rules selected from a group consisting of: removing a file based on a predefined length of time to store said file, removing older files to maintain a storage space requirement, removing a file based on a type of said file, removing a file based on an owner or permission setting of said file, and combinations thereof; and
a user interface comprising a recycle folder comprising visual indicators of contents from both said local recycle folder and said network recycle folder in said recycle folder;
where said local file is not transferred to said server managed folder and said network file is not transferred to said local recycle folder.

17. The client device of claim 16, said managed folder having access controls.

* * * * *